(12) United States Patent
McMahan

(10) Patent No.: US 7,754,127 B2
(45) Date of Patent: Jul. 13, 2010

(54) METHOD FOR FABRICATING AN ANTI-FATIGUE MAT

(75) Inventor: Robert L. McMahan, Cedar Park, TX (US)

(73) Assignee: Let's Gel, Inc., Austin, TX (US)

( * ) Notice: Subject to any disclaimer, the term of this patent is extended or adjusted under 35 U.S.C. 154(b) by 537 days.

(21) Appl. No.: 11/537,648

(22) Filed: Sep. 30, 2006

(65) Prior Publication Data

US 2008/0078028 A1 Apr. 3, 2008

(51) Int. Cl.
*B32B 37/00* (2006.01)
*B29C 65/00* (2006.01)

(52) U.S. Cl. ............ 264/261; 264/248; 264/299; 264/138; 156/292

(58) Field of Classification Search ............ None
See application file for complete search history.

(56) References Cited

U.S. PATENT DOCUMENTS

| | | | |
|---|---|---|---|
| 3,259,925 A | 7/1966 | Tilles | |
| 3,634,895 A | 1/1972 | Childers | |
| 3,996,326 A * | 12/1976 | Schachet | 264/158 |
| 4,010,301 A | 3/1977 | Anderson | |
| 4,119,583 A | 10/1978 | Filip | |
| 4,450,193 A | 5/1984 | Staebler | |
| 4,574,101 A | 3/1986 | Tricca | |
| 4,843,666 A | 7/1989 | Elesh | |
| 4,913,755 A * | 4/1990 | Grim | 156/145 |
| 5,176,864 A * | 1/1993 | Bates et al. | 264/137 |
| 5,645,914 A | 7/1997 | Horowitz | |
| 5,749,111 A | 5/1998 | Pearce | |
| 6,026,527 A | 2/2000 | Pearce | |
| 6,187,837 B1 | 2/2001 | Pearce | |
| 6,314,598 B1 | 11/2001 | Yates | |
| 6,324,710 B1 | 12/2001 | Hernandez | |
| 6,325,956 B2 | 12/2001 | Chaudhary et al. | |
| 6,371,430 B1 * | 4/2002 | Vernackt | 248/362 |
| 6,440,335 B1 * | 8/2002 | Kingsbury et al. | 264/2.2 |
| 6,568,005 B2 | 5/2003 | Fleming | |
| 6,651,277 B1 | 11/2003 | Marson | |
| 6,681,416 B1 | 1/2004 | Yang | |
| 6,705,953 B2 | 3/2004 | Haskins | |

(Continued)

OTHER PUBLICATIONS

Premo-Promos "Cyber Gel Mouse Pad"—Premo-Promos, LLC—(c) 2003.

(Continued)

*Primary Examiner*—Christina Johnson
*Assistant Examiner*—Benjamin Schiffman
(74) *Attorney, Agent, or Firm*—Mark P Kahler

(57) ABSTRACT

A method and apparatus are disclosed for fabricating an anti-fatigue mat that employs a layer of resilient gel material. The method employs a frame assembly that receives a flexible sheet to form the base sheet of the mat. In one embodiment, the frame assembly includes a movable frame member having an angled aperture for controlling the geometry of the gel layer when heated gel is dispensed into the aperture. In one embodiment, the frame assembly receives another flexible sheet disposed on the gel layer to form the support sheet of the mat. In one embodiment, the frame assembly may further include a cooling channel for convective or liquid cooling of liquid gel dispensed into a gel receiving cavity formed by the aperture.

22 Claims, 25 Drawing Sheets

U.S. PATENT DOCUMENTS

| | | | |
|---|---|---|---|
| 6,851,141 B2 | 2/2005 | McMahan | |
| 6,893,600 B2 * | 5/2005 | Hughes et al. | 264/328.7 |
| 6,991,842 B2 | 1/2006 | Hurwitz | |
| 7,056,564 B2 | 6/2006 | Sereboff | |
| 7,062,807 B2 | 6/2006 | Conforti | |
| 7,076,822 B2 | 7/2006 | Pearce | |
| 2004/0211005 A1 | 10/2004 | Kuo | |
| 2005/0273936 A1 | 12/2005 | Chul | |
| 2006/0156581 A1 | 7/2006 | Holden | |
| 2006/0213081 A1 | 9/2006 | Geer | |
| 2006/0253988 A1 * | 11/2006 | Pearce | 5/655.5 |
| 2008/0034614 A1 * | 2/2008 | Fox et al. | 36/43 |

OTHER PUBLICATIONS

Epinions—Revised—Fellowes gel rest & mouse pad-feels great—May 25, 2000 (updated Nov. 8, 2000).
Branders.com—Fun Mousepads (c) 2002.
Good Raise Chemical—Soft Mat (c) 1999-2004.
Lazy J Quarterhorses—Tenderfoot Stall Mats (c) 2002.

* cited by examiner

700

700

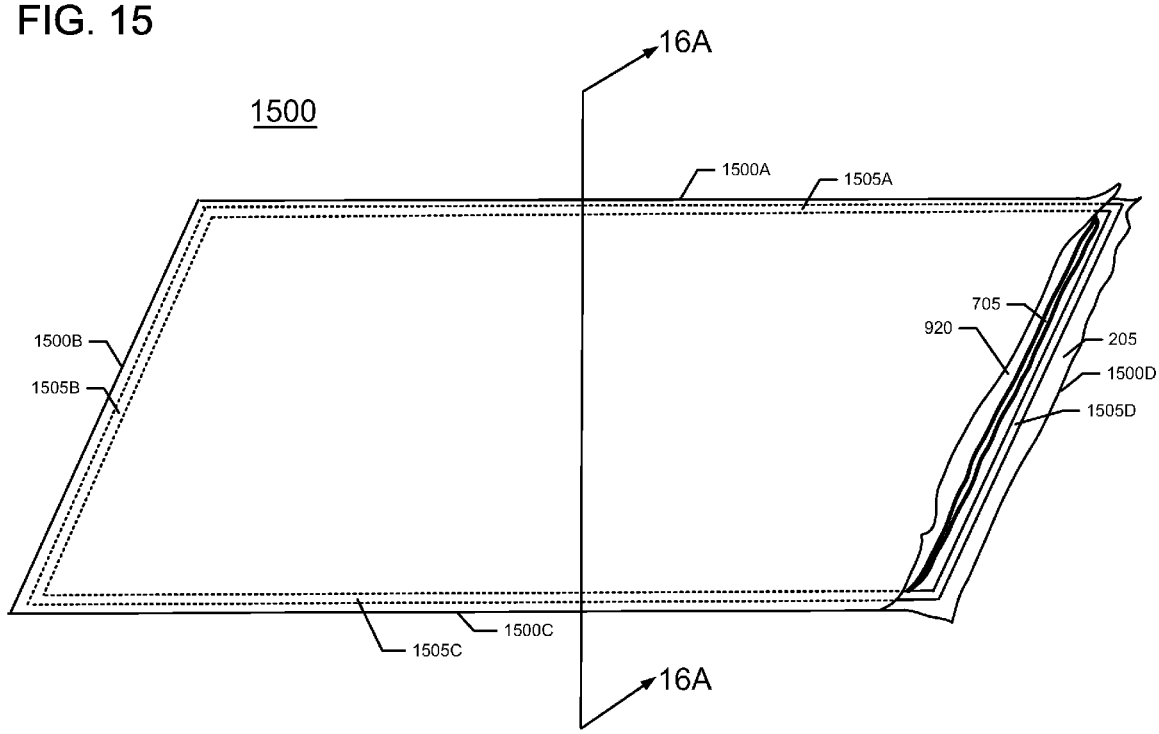

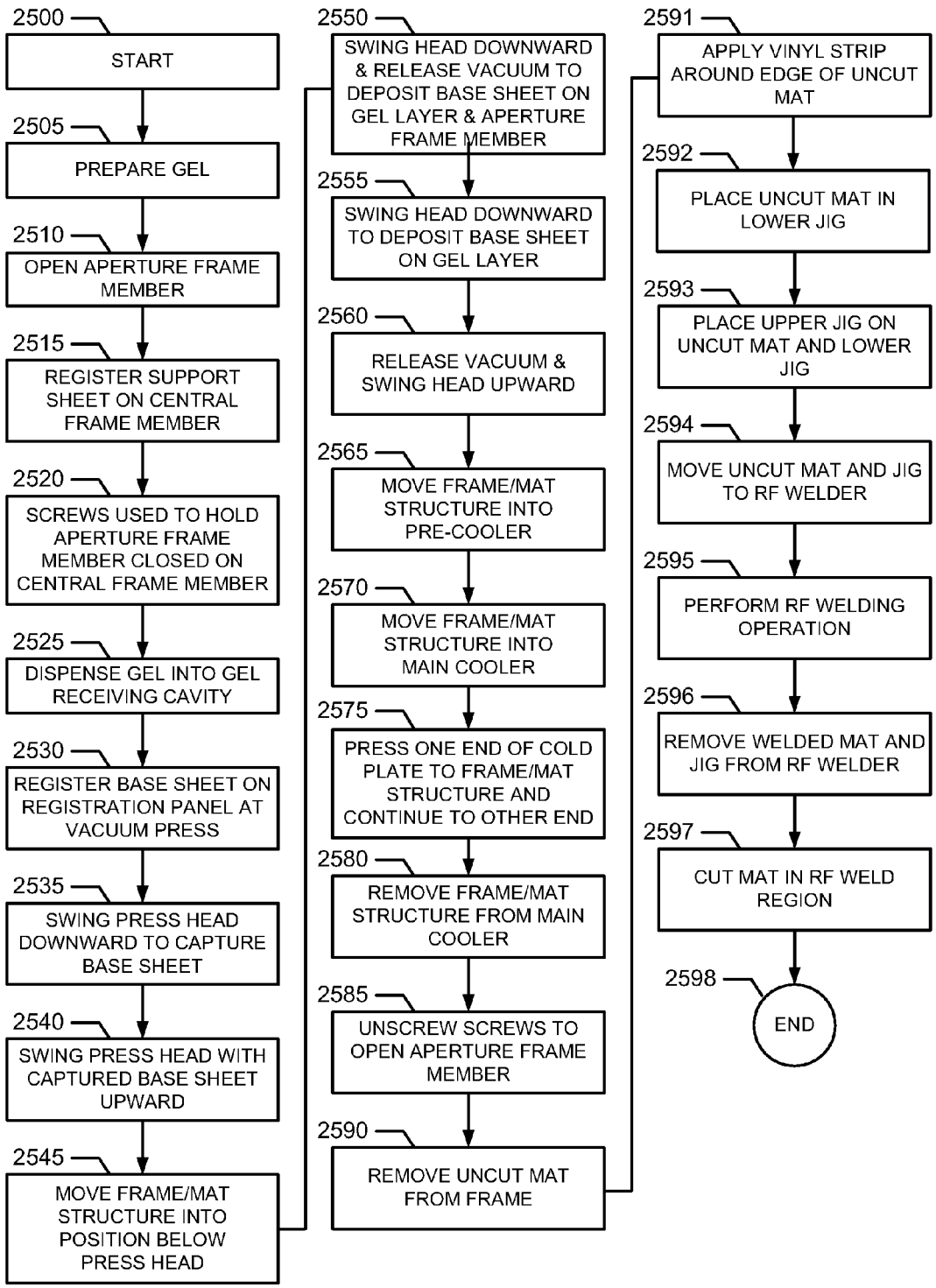

METHOD FOR FABRICATING AN
ANTI-FATIGUE MAT

TECHNICAL FIELD OF THE INVENTION

The disclosures herein relate generally to mats and more particularly to methodology and apparatus for manufacturing resilient floor mats for reducing user fatigue.

BACKGROUND

Floor mats have been used for years to provide a cushion for the person standing on the mat. However, fatigue can still result when a person stands on a mat for an extended period of time. Persons who work standing up most of the day, such as cashiers, assembly line operators, people in home or commercial kitchens and many others still experience fatigue after standing on a conventional mat for long periods of time. Often floor mats are provided with non-slip surfaces to lessen slippage and to thus promote safety.

Mats of resilient foam are known to reduce user fatigue. Unfortunately however, foam mats have the disadvantage of becoming brittle over time. Conventional foam mats lose their properties as air cells in the mat compress. Moreover, conventional foam mats collect moisture over time. This condition can promote the growth of bacteria and fungus. These undesirable characteristics result in foam mats becoming unsuitable for use as they become older.

A mat containing gel sandwiched between various cover layers may address these problems. For example, my U.S. Pat. No. 6,851,141 discloses a resilient mat, one embodiment of which includes a resilient gel inner layer surrounded by a support ring to which an upper cover member and a lower cover member are attached. However, manufacturing such gel-based mats can be difficult. For example, difficulties can be encountered in adhering the upper cover member to the lower cover member. Moreover, undesired wrinkling of the cover members may also be experienced during the manufacture of a gel-based mat. Undesired wrinkling or creasing may also occur when a gel-based mat is stored for shipping in a rolled-up position for an extended period of time and then later unrolled by the user prior to use.

What is needed is a method of manufacturing a gel-based mat that addresses one or more of the above described problems.

SUMMARY

Accordingly, in one embodiment, a method is disclosed for fabricating an anti-fatigue mat. The method includes positioning a first flexible sheet on a first frame member. The method also includes positioning a second frame member on the first flexible sheet, the second frame member including an aperture configured to accept liquid gel therein. The method still further includes dispensing liquid gel into the aperture in the second frame member so that the gel covers substantially all of a surface of the first flexible sheet exposed by the aperture. The method also includes positioning a second flexible sheet on the second frame member and covering the liquid gel.

In another embodiment, another method of fabricating an anti-fatigue mat is disclosed. The method includes positioning a first flexible sheet on a first frame member. The method also includes positioning a second frame member on the first flexible sheet, the second frame member including an aperture configured to accept liquid gel therein. The method further includes dispensing the liquid gel into the aperture in the second frame member to form a gel layer that the gel covers a surface of the first flexible sheet exposed by the aperture. The method still further includes positioning a flexible buffer sheet covering the gel layer in the aperture. The method also includes positioning a second flexible sheet on the second frame member and covering the flexible buffer sheet.

In another embodiment, an anti-fatigue mat is disclosed. The disclosed mat includes a first flexible sheet and a resilient gel layer situated on the first flexible sheet. The mat also includes a flexible buffer sheet situated on the resilient gel layer. The flexible buffer sheet adheres to the resilient gel layer. The mat further includes a second flexible sheet situated on the flexible buffer sheet, the flexible buffer sheet being moveable with respect to the second flexible sheet. The first flexible sheet is attached to the second flexible sheet adjacent an outer edge of the first flexible sheet and an outer edge of the second flexible sheet.

In another embodiment, a frame assembly for manufacturing an anti-fatigue mat is disclosed. The frame assembly includes a first frame member including first and second opposed surfaces. The frame assembly also includes a second frame member situated on the first surface of the first frame member. The second frame member includes an aperture configured to receive liquid gel therein. The frame assembly further includes a coupling between the first frame member and the second frame member that allows the second frame member to open to receive a first flexible sheet between the first frame member and the second frame member. The coupling allows the second frame member to close to retain the first flexible sheet. In one embodiment, at least one cooling channel is situated adjacent the second surface of the first frame member.

BRIEF DESCRIPTION OF THE DRAWINGS

The appended drawings illustrate only exemplary embodiments of the invention and therefore do not limit its scope, because the inventive concepts lend themselves to other equally effective embodiments.

FIG. 15 shows the uncut mat after removal from the frame assembly.

FIG. 25 is a flowchart describing representative steps employed in the disclosed mat fabrication methodology.

DETAILED DESCRIPTION

Figure 1:
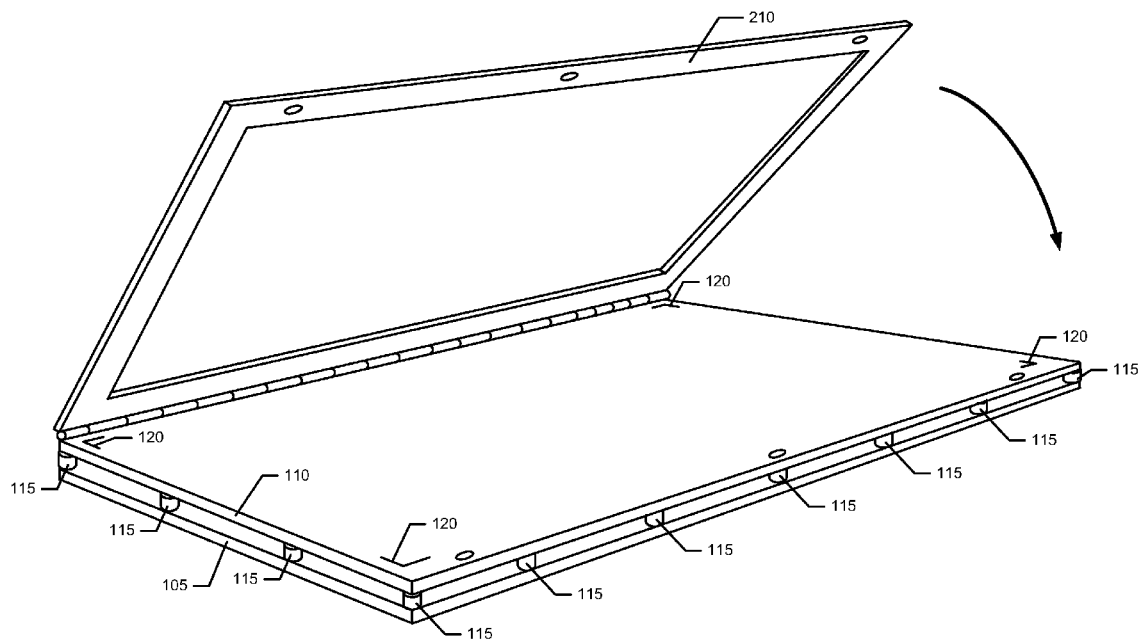
FIG. 1 shows a portion of a frame assembly used to fabricate an anti-fatigue mat.

FIG. 1 shows a portion of a frame assembly 100 that the disclosed methodology employs to fabricate a mat filled with resilient material. In one embodiment, the resilient material is a viscoelastic polymer material such as a synthetic rubber-based gel, a polyurethane-based gel or a silicon-based gel. Frame assembly 100 includes a base frame member 105 that is fabricated of metal such as aluminum for example. Frame assembly 100 also includes a central frame member 110 that is spaced apart from base frame member 105 by spacers 115. In one embodiment, spacers 115 are fabricated of Teflon™ material. (Teflon is a trademark of DuPont.) Spacers 115 space base frame member 105 and central frame member 110 sufficiently far apart to allow cooling air to flow in the space or channel between these members. In this manner, convective cooling may be provided to a mat fabricated in the frame assembly as later described in more detail. Other cooling apparatus such as liquid cooling apparatus may be used in place of the convective cooling apparatus described above.

Central frame member 110 includes registration marks 120 that are used to register a support sheet in a step of the disclosed method. More particularly, turning to FIG. 2, a flexible support sheet 205 is registered or aligned with registration marks 120 as shown. In one embodiment, the support sheet 205 forms the side of the mat that faces the user while in use on a floor or other surface. The support sheet 205 contrasts with the base sheet of the mat (not shown in this view), namely the opposite side of the mat which faces the floor or other surface while the mat is in use. In this particular embodiment of the disclosed method, the mat is fabricated in an inverted orientation, namely with the support sheet 205 being placed lowermost in assembly 100 and the base sheet being placed uppermost in the assembly as shown below. However, this order may be reversed if desired.

Figure 2:
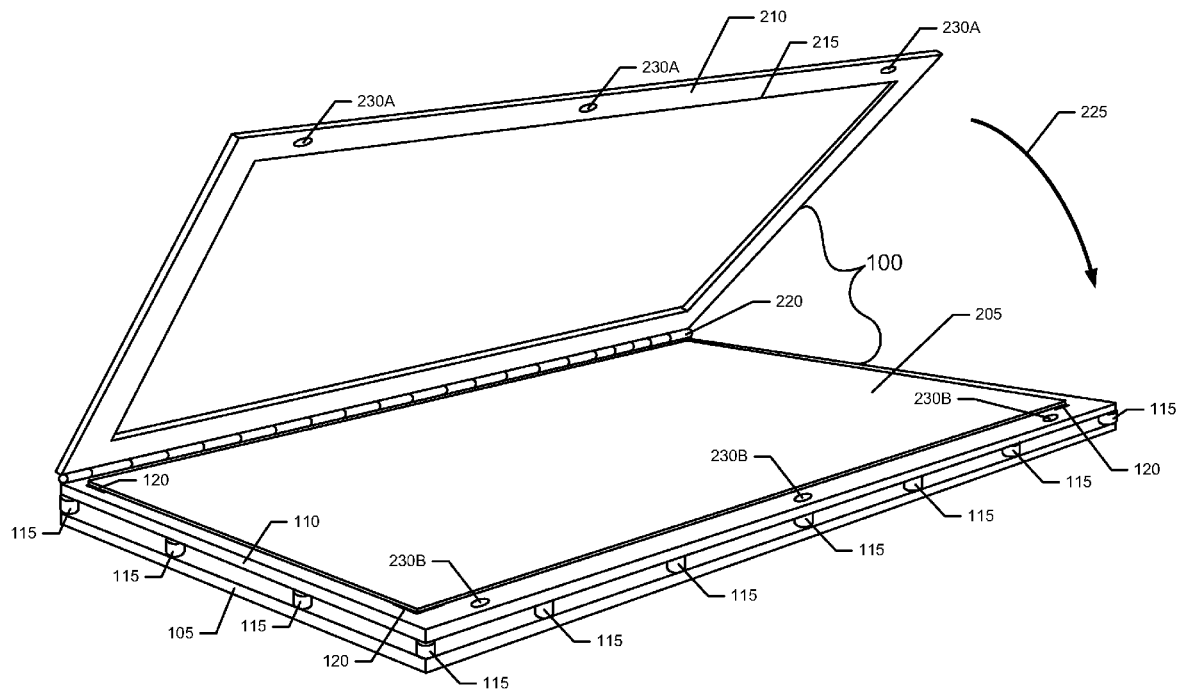
FIG. 2 shows a portion of the frame assembly with a sheet member in position thereon.

Assembly 100 also includes an aperture frame member 210 having an aperture 215 therein. Aperture frame member 210 is mechanically rotatably coupled to central frame member 110 by a hinge 220 as shown. FIG. 2 shows assembly 100 in the open position with support sheet 205 registered in position on central frame member 110. Once support sheet 205 is so registered, aperture frame member 210 is rotated from the open position to the closed position in the direction indicated by arrow 225. Aperture frame member 210 includes screw holes 230A that align with threaded screw holes 230B in central frame member 110 when the aperture frame member 210 is closed. The aperture 215 typically exhibits the same geometry as the desired geometry of the mat being fabricated. In other words, if a rectangular, square, circular or elliptical mat is being fabricated, then aperture 215 exhibits a rectangular, square, circular or elliptical geometry, respectively. The frame members 105, 110 and 210 may also exhibit the same geometry as aperture 215 although such structures are larger than aperture 215. While in one embodiment, frame members 105, 110 and 210 are fabricated of aluminum, it is also possible to fabricate the frame members from silicon, steel and other durable materials.

Figure 3:
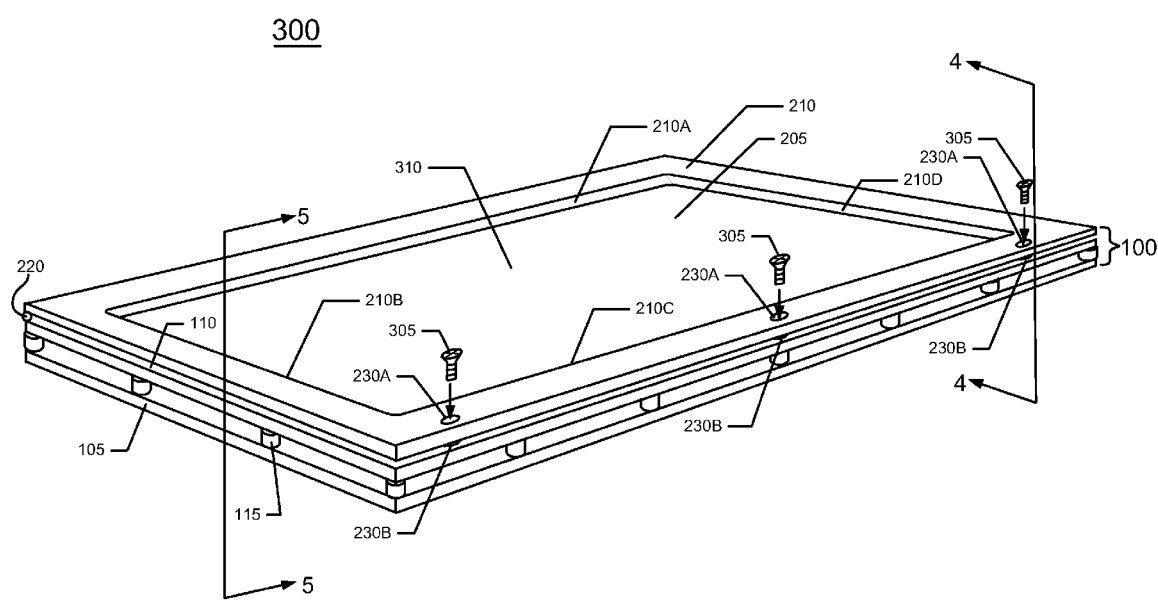
FIG. 3 shows a complete frame assembly.

FIG. 3 shows a frame/mat structure 300 that includes frame assembly 100 in the closed position with support sheet 205 retained therein. With frame assembly 100 so closed, holes 230A align with screw holes 230B. Screws 305 are placed in holes 230A and threaded into corresponding threaded holes 230B. Screws 305 are tightened into threaded holes 230B until frame assembly 100 snugly holds support sheet 205 in place. In one embodiment, the four inner edges 210A, 210B, 210C and 210D of aperture frame member 210 are angled inward to provide a non-trip feature to the manufactured mat as described below in more detail. In this particular example, an angle of 45 degrees is used for inner edges 210A, 210B, 210C and 210D with respect to the major plane of aperture frame member 210. Angles smaller or larger than 45 degrees may also be used depending on the particular application. Frame assembly 100 together with support sheet 205 forms a gel-receiving cavity 310 as described in more detail below.

Figure 4:
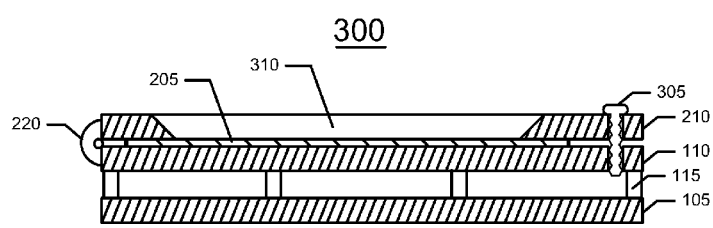
FIG. 4 is cross section of the frame assembly of FIG. 3 taken along section line 4-4.
Figure 5:
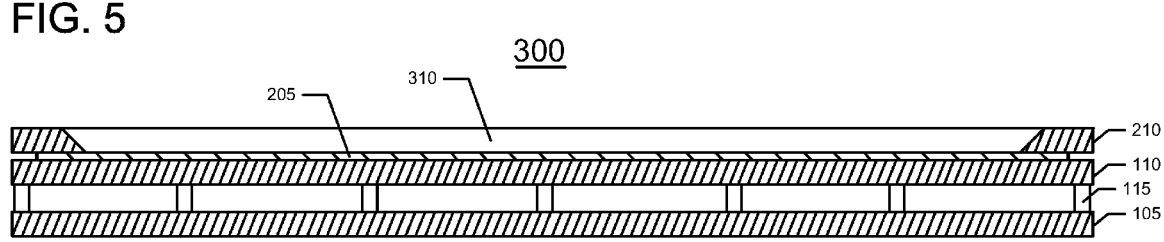
FIG. 5 is a cross section of the frame assembly of FIG. 3 taken along section line 5-5.

FIG. 4 is a cross section of the frame/mat structure 300 of FIG. 3 taken along section line 4-4. FIG. 4 shows gel-receiving cavity 310 prior to injection of liquid gel therein. FIG. 5 is another cross section of frame/mat structure 300 of FIG. 3 except taken along section line 5-5.

Figure 6:
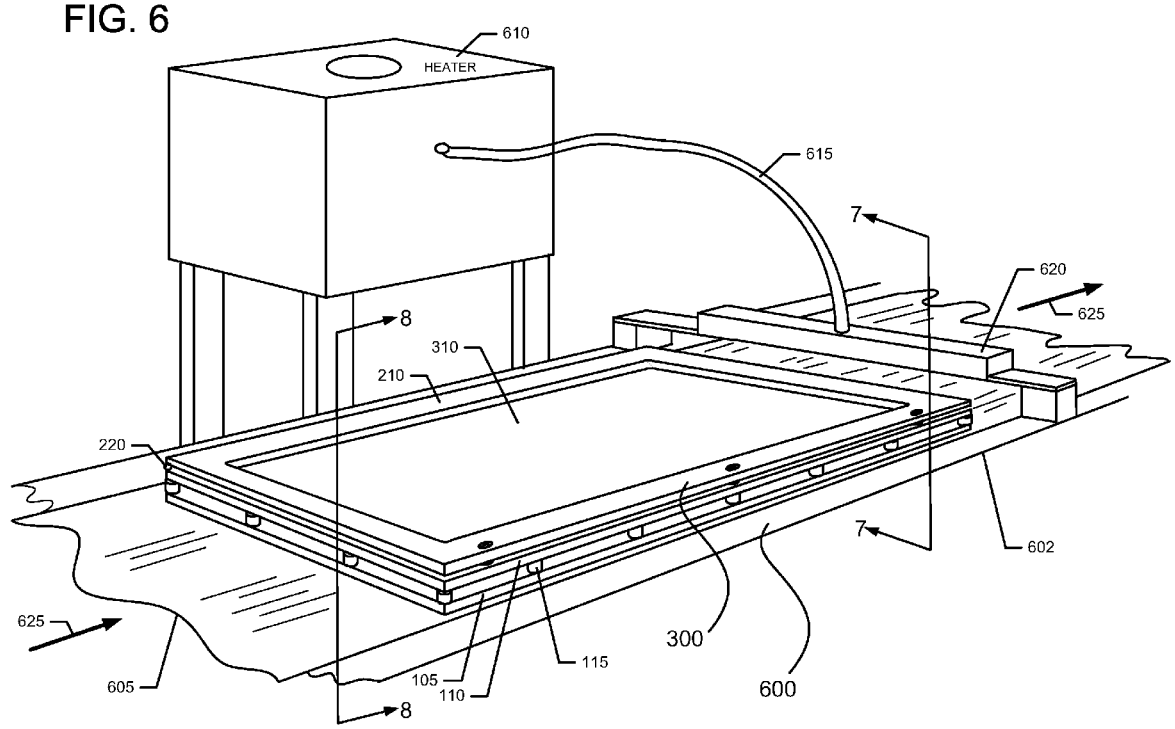
FIG. 6 shows the frame assembly of FIG. 3 at a gel dispensing station.

FIG. 6 shows a work station 600 as a portion of an assembly line 602 in which a mat is fabricated according to the disclosed methodology. The particular view of workstation 600 shown in FIG. 6 shows frame/mat structure 300 prior to dispensing gel into the gel receiving cavity 310. Workstation 600 includes a conveyer belt 605 upon which frame/mat structure 300 is situated before liquid gel is dispensed therein. In one embodiment, gel is supplied to a heater 610 that heats the gel to a temperature at which the gel melts and becomes liquid, for example approximately 410° F. in one embodiment. It may also be possible to supply liquid gel to gel receiving cavity 310 without heating the gel if the gel is liquid at ambient or room temperature, for example approximately 75° in one embodiment. In such an embodiment the gel would be designed to cure over time into a gel layer exhibiting a desired durometer or softness. A hose 615 supplies liquid gel from heater 610 to a dispenser head 620 that is situated above conveyer belt 605 on assembly line 602. To fill cavity 310 with liquid gel, a controller (not shown) instructs conveyer belt 605 to move in the direction indicated by arrows 625. As cavity 310 passes below dispenser head 620, dispenser head 620 dispenses heated liquid gel into cavity 620 so that cavity 620 is filled with gel before frame/mat structure 300 exits dispenser head 620. The controller (not shown) may be programmed to instruct dispenser head 620 to commence dispensing gel when cavity 310 starts to pass below dispensing head 620 and to cease dispensing gel slightly before cavity 310 exits dispensing head 620.

Figure 7:
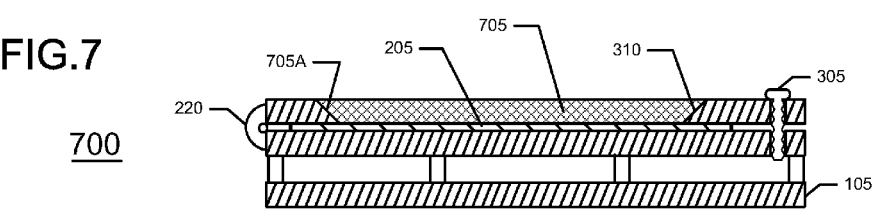
FIG. 7 shows the frame assembly of FIG. 6 at a gel dispensing station taken along section line 7-7.
Figure 8:
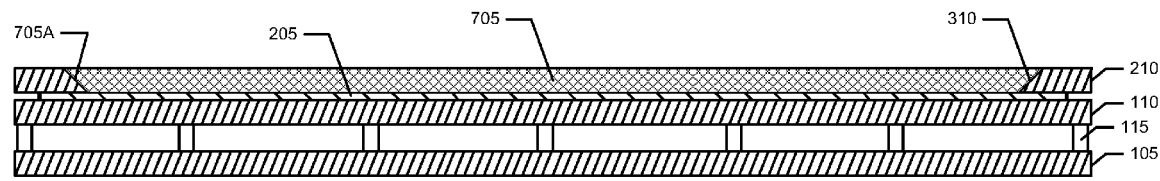
FIG. 8 shows the frame assembly of FIG. 6 at a gel dispensing station taken along section line 8-8.

FIG. 7 shows a cross section of frame/mat structure 300 taken along section line 7-7 of FIG. 6 after liquid gel 705 is dispensed into cavity 310. A crisscross hatching denotes gel 705 in cavity 310 in FIG. 7. The outer edge 705A of gel layer 705 exhibits an angle of 45 degrees to provide the anti-trip feature mentioned above. As mentioned above, other angles may also produce acceptable results. FIG. 8 shows a similar cross section of frame/mat structure 300 except this cross section is taken along a different section line 8-8 of FIG. 6.

Figure 9:
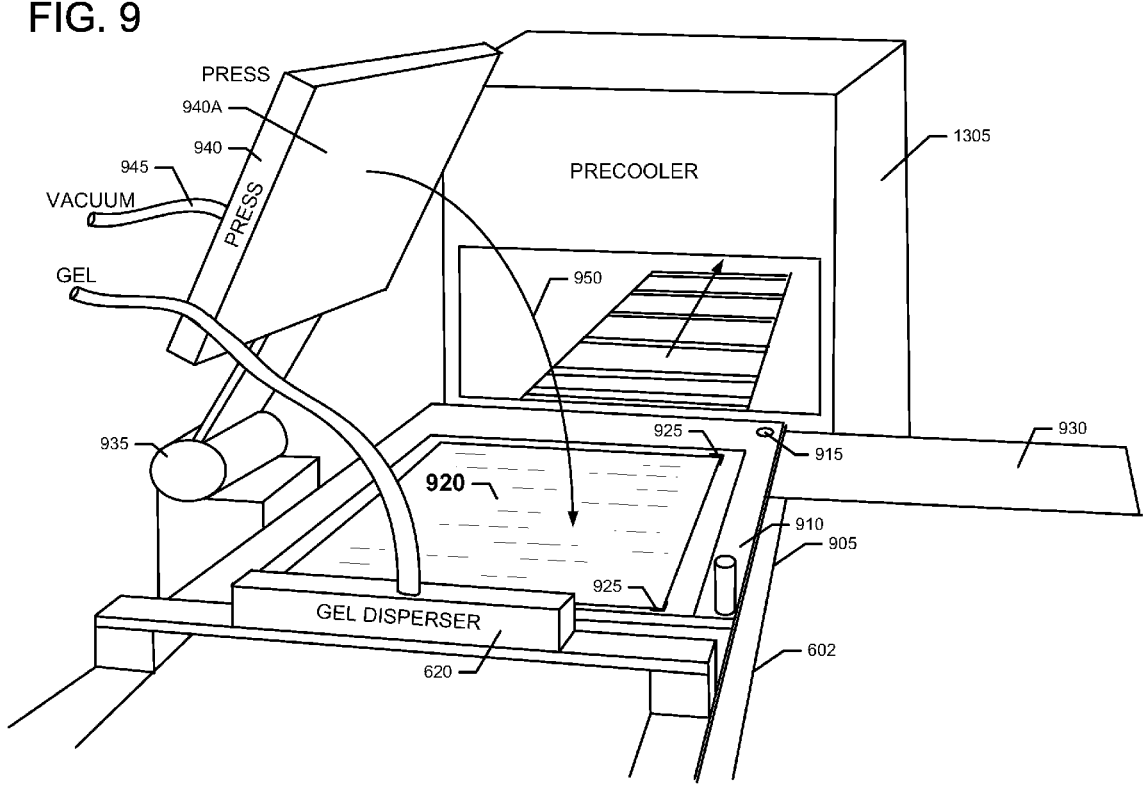
FIG. 9 shows a vacuum press station for positioning a flexible sheet on a gel layer in the frame assembly.

FIG. 9 shows a perspective view of another portion of the assembly line 602 including a pressing station 905. This view illustrates pressing station 905 prior to the arrival of sheet/mat structure 300 so that the preparation of a flexible base sheet 920 may be seen. Pressing station 905 includes a registration panel 910 fabricated from a solid material such as wood or metal. Registration panel 910 rotates or swings from side to side about a pivot 915. An operator or automated equipment places and aligns a base sheet 920 between registration marks 925. In one embodiment, when fabrication of the mat is complete, base sheet 920 becomes the surface of the mat that faces the floor or other surface on which the mat is used. In one embodiment, base sheet 920 is actually placed on registration panel 910 when registration panel 910 is swung into position on a worktable 930. Then when registration of base sheet 920 between registration marks 925 is complete, panel 910 is swung from its position atop worktable 930 to a location under vacuum press 935 as shown in FIG. 9.

Press 935 includes a head 940 with a flat surface 940A that is capable of holding a sheet of material such as base sheet 920 thereto under vacuum. A vacuum hose 945 connects to press 935 to provide partial vacuum to head 940. When the registered base sheet 920 is in position below press head 940 as shown in FIG. 9, an operator or automated controller rotates press head 940 downward as indicated by arrow 950 until the press head contacts base sheet 920. Base sheet 920 is then held to press head 940 by the partial vacuum.

Figure 10:
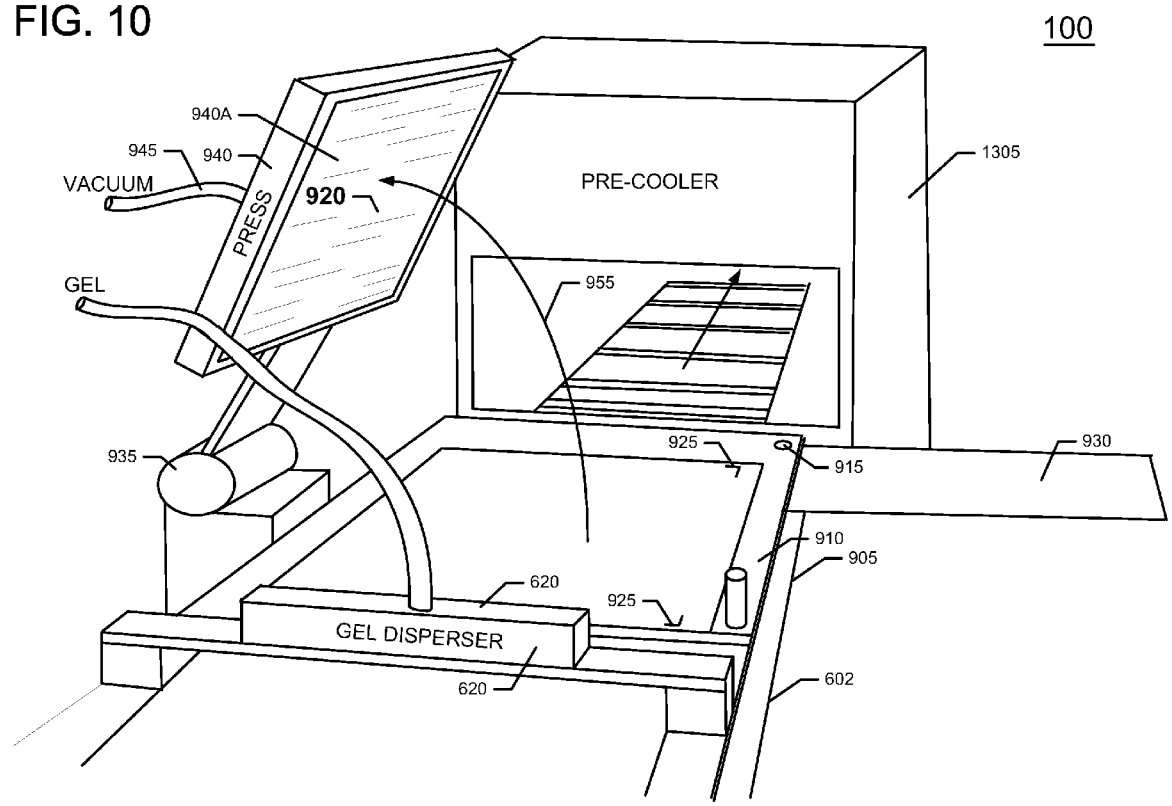
FIG. 10 shows the vacuum press station of FIG. 9 after the vacuum press picks up the flexible sheet.

FIG. 10 shows that base sheet 920 adheres to press head 940 via vacuum action when press 920 is opened as indicated by the direction of arrow 955. With base sheet 920 so positioned on press head 940, registration panel 910 is rotated or otherwise moved to table 930 to leave press station 905 clear to receive frame assembly 700. FIG. 10 shows registration panel 910 prior to being moved to table 930.

Figure 11:
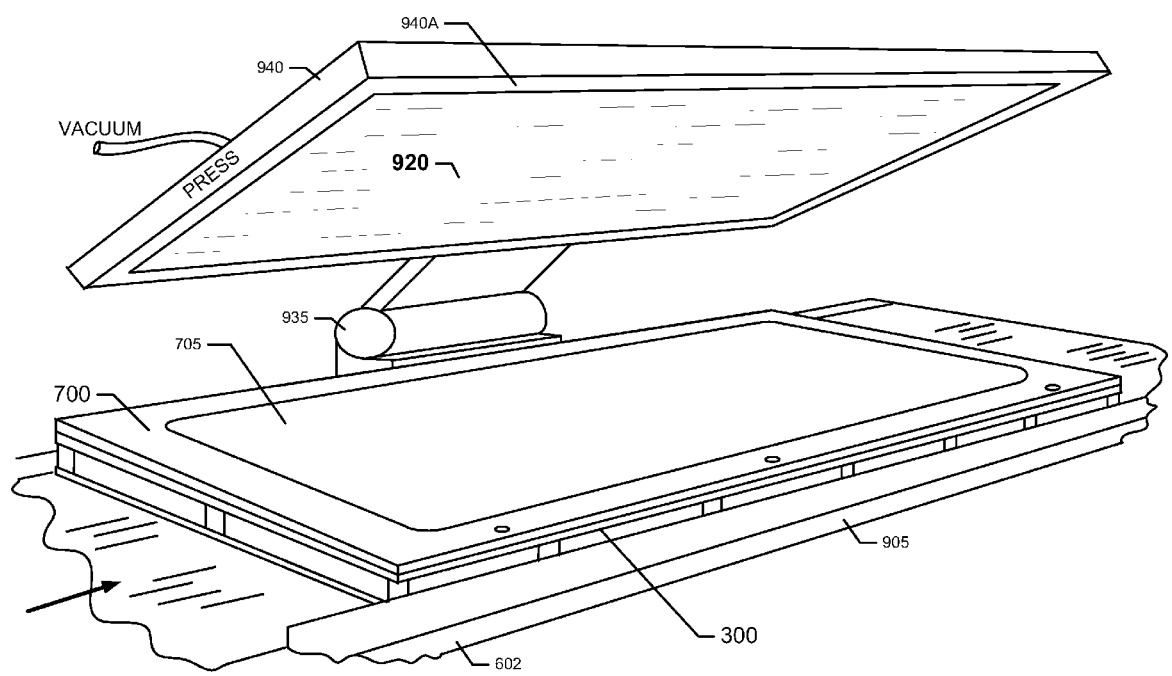
FIG. 11 shows the vacuum press station of FIG. 9 prior to placement of the flexible sheet on the gel layer.
Figure 12:
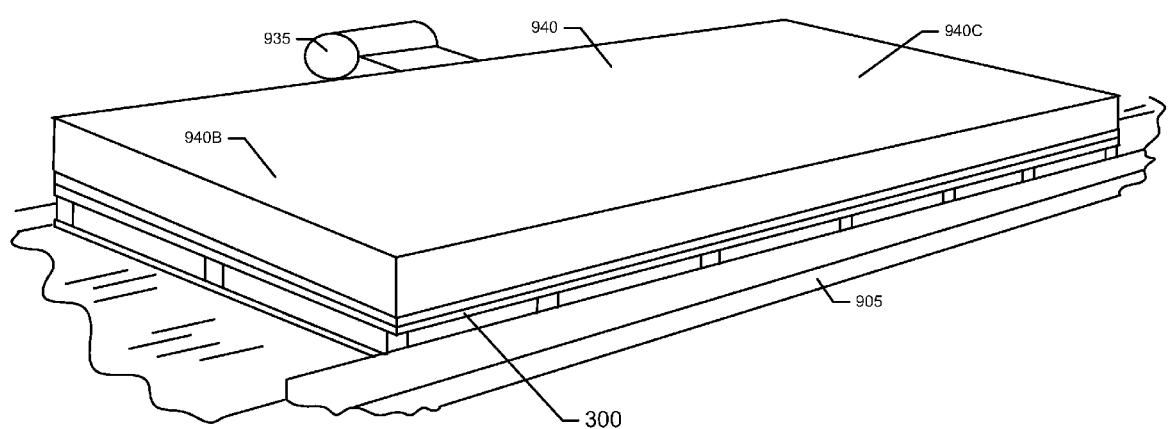
FIG. 12 shows the vacuum press station of FIG. 9 after the head is closed to deposit a flexible sheet on the gel layer in the frame assembly.

FIG. 11 shows frame/mat structure 300 after being moved into position below press head 940 on assembly line 602. Frame/mat structure 300 is filled with liquid gel as depicted in FIGS. 7 and 8. With frame/mat structure 300 and base sheet 920 so positioned, an operator or programmable controller closes press head 940 onto frame/mat structure 300 as shown in FIG. 12. To assure that air bubbles are not trapped in the liquid gel, when press head 940 is closed an operator or programmable controller first applies pressure to one end 940B of press head 940 and then continues applying pressure across press head 940 until ending with the application of pressure at end 940C. Press 935 is configured such that press head 940 holds base sheet 920 (not visible in FIG. 12) in registration with support sheet 205 (also not visible in FIG. 12). In other words, press head 935 assures that base sheet 920 aligns with support sheet 205 when press head 935 deposits base sheet 920 on frame/mat structure 300.

Figure 13:
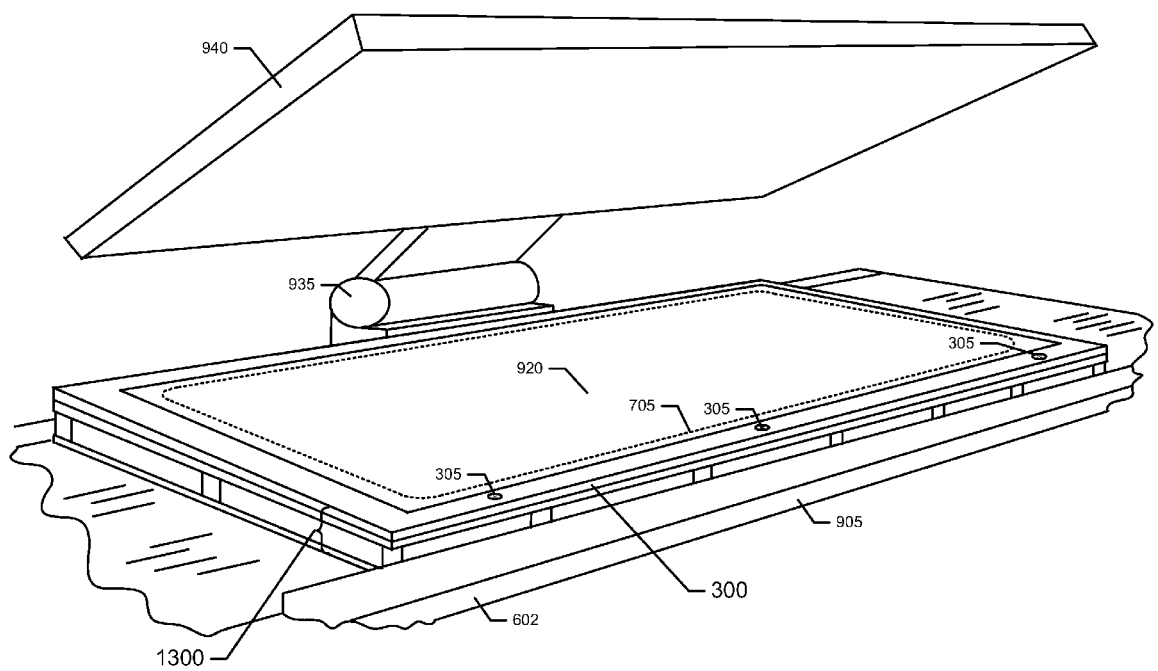
FIG. 13 shows the vacuum press station of FIG. 9 when the head is reopened after the deposit of a flexible sheet on the gel layer in the frame assembly.

FIG. 13 shows press 935 after it has been opened to reveal the frame/mat structure 1300 formed by base sheet 920 and frame/mat structure 300 on which base sheet 920 now rests. Gel layer 705 is shown in dotted lines to indicate that gel layer 705 is below base sheet 920 in this particular view. As seen in FIG. 13, base sheet 920 overlaps the edges of gel layer 705 to provide a margin which will be attached to a similar margin of support sheet 205. Press 935 thus functions to place base sheet 920 on gel layer 705 and support sheet 205 therebelow in a vertically aligned manner. Instead of using press 935 for this purpose, it may also be possible to employ a roller to roll on a sheet such as sheet 920.

Returning to FIG. 10, it is seen that a pre-cooler 1305 is the next work station of the assembly line 602 after pressing station 905. After press 935 presses base sheet 920 to frame/mat structure 300 to form frame/mat structure 1300, frame/mat structure 1300 moves down the assembly line and enters pre-cooler 1305. In one embodiment, pre-cooler 1305 chills assembly 1300 at an air temperature of approximately 50° F. for approximately 3 minutes. Different temperatures and times can be used depending upon the particular application.

Figure 14:
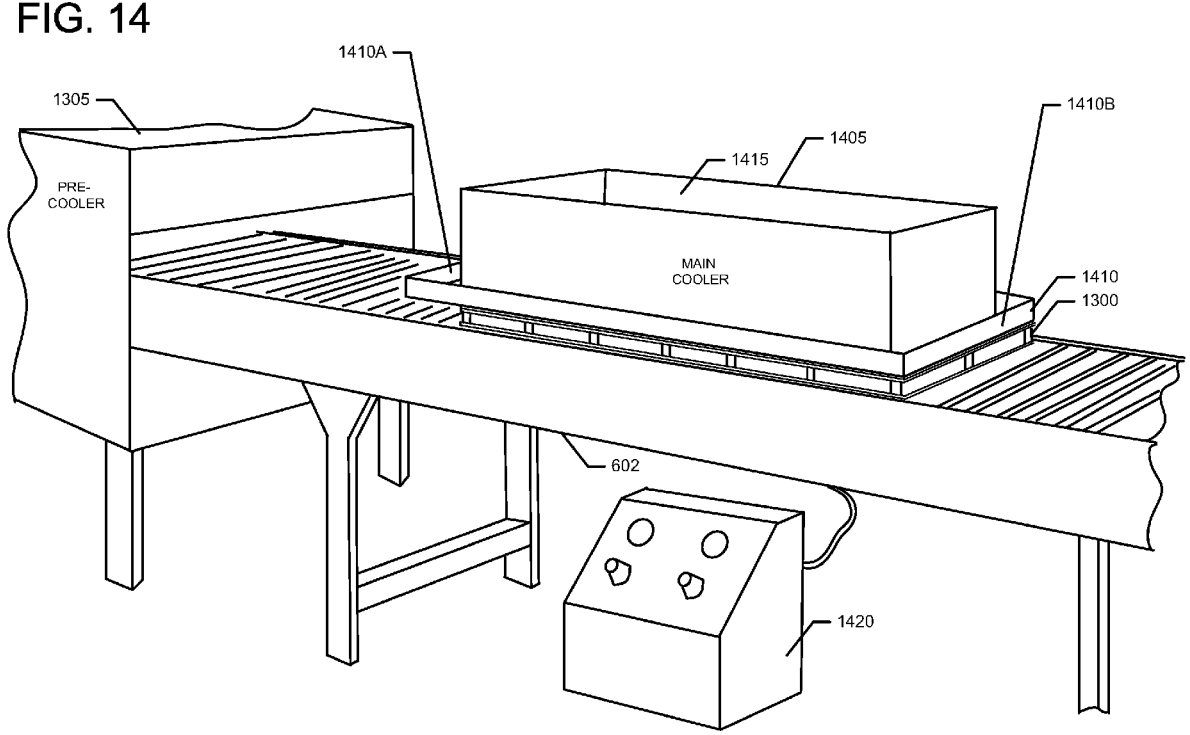
FIG. 14 shows a pre-cooler and main cooler employed in the assembly line used to fabricate a mat using the disclosed methodology.

FIG. 14 shows frame/mat structure 1300 after an operator or programmed controller moves frame/mat structure 1300 down the assembly line 602 from pre-cooler 1305 to a position under a main cooler 1405 that acts as a main cooling station in the line. In one embodiment, main cooler 1405 includes a pneumatic driven press plate 1410. A coolant receiving vessel or chamber 1415 is situated on press plate 1410. In one embodiment, chamber 1415 is filled with ice to maintain the temperature of the press plate at 32 degrees F. In another embodiment, chamber 1415 is replaced with coolant carrying pipes in which a liquid such as alcohol flows to maintain the temperature of press plate 1410 at temperatures lower than 32 degrees F.

Before frame/mat structure 1300 enters main cooler 1405, a controller 1420 instructs press plate 1410 to raise up a sufficient vertical distance to allow frame/mat structure 1300 to enter the space under press plate 1410. With frame/mat structure 1300 so positioned under main cooler 1405, controller 1420 instructs press plate 1410 to move downward to apply cooling pressure to frame/mat structure 1300. In a manner similar to that discussed with reference to FIG. 12, press plate 1410 first applies pressure to assembly 1300 at plate end 1410A and then continues to apply pressure along press plate 1410 along its length until pressure is applied at plate end 1410B. In one embodiment, frame/mat structure 1300 remains in main cooler 1405 for approximately 2 minutes. Frame/mat structure 1300 may remain in main cooler 1405 for less or more time depending upon the particular application.

Frame/mat structure 1300 next exits main cooler 1405. An operator or machine under program control removes screws 305 (shown above in FIG. 13) from aperture frame member 210. Aperture frame member 210 is then removed from the remainder of the assembly. This allows the uncut mat formed by support sheet 205, gel layer 705 and base sheet 920 to be easily removed from central frame member 110. As seen in FIG. 15, since the mat is uncut around its peripheral edges 1500A, 1500B, 1500C and 1500D, the mat is referred to as uncut mat 1500 at this point in the fabrication process. The rightmost end of uncut mat 1500 is flared open to show gel layer 705 between support sheet 205 and base sheet 920. It is noted that the mat is still inverted at this point in the fabrication process with support sheet 205 on the bottom and base sheet 920 on top.

As part of the process for completing uncut mat 1500, support sheet 205 and base sheet 920 are connected to one another along the 4 edges 1500A, 1500B, 1500C and 1500D. In one embodiment, wherein both support sheet 205 and base sheet 920 are fabricated from a resilient material such as vinyl, 4 strips of like material, namely vinyl in this case, are positioned around the periphery of uncut mat 1500. FIG. 15 shows these 4 strips as vinyl strips 1505A, 1505B, 1505C and 1505D which are respectively positioned adjacent edges 1500A, 1500B, 1500C and 1500D as shown. These vinyl strips are positioned between support sheet 205 and base sheet 920 to facilitate the adherence of support sheet 205 to base sheet 920 along the edges of the mat. The vinyl strips 1500A-1500D may be manually positioned at the locations shown in FIG. 15. Alternatively, support sheet 205 may be prefabricated with the vinyl strips already present thereon prior to beginning the fabrication process. In yet another embodiment, base sheet 920 may be prefabricated with the vinyl strips already present thereon prior to the start of the mat fabrication process. In one embodiment, support sheet 205 includes a decorative fabric to improve the appearance of the mat. For example, a synthetic leather material may be bonded to a fabric backing material to form flexible support sheet 205. When the user stands on the mat, the support sheet 205 is oriented upward so that the decorative fabric is visible to the user. Support sheet 205 may thus provide a cosmetically appealing surface. Flexible base sheet 920 faces downward toward the floor or other usage surface. Base sheet 920 is intended to provide a high friction surface so that when placed on the floor, the mat is stable and does not slide during use. One material that may be employed for base sheet 920 is a high friction vinyl or urethane laminated to a fabric backing.

Figure 16A:
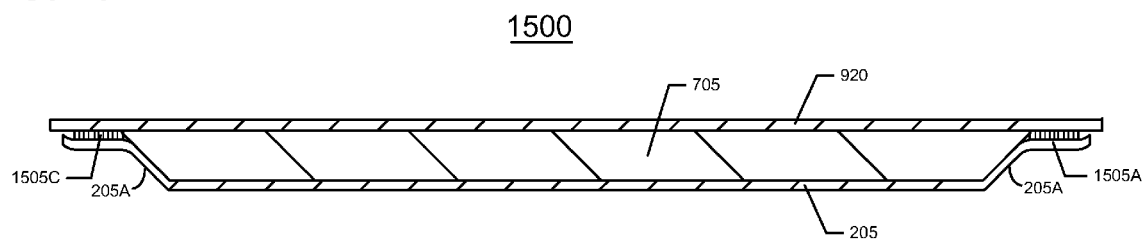
FIG. 16A is a cross section of the uncut mat taken along section line 16A-16A of FIG. 15 in an embodiment that employs a vinyl strip to promote the adherence of the sheets forming the mat together.
Figure 16B:
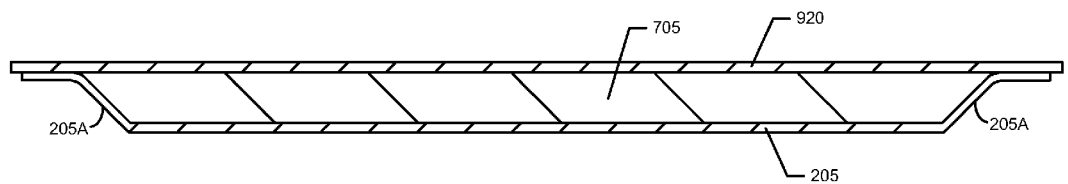
FIG. 16B is a cross section of the uncut mat taken along section line 16A-16A of FIG. 15 in an embodiment that employs a direct RF weld to connect the sheets forming the mat together.

FIG. 16A shows a cross section of uncut mat 1500 taken along section line 16A-16A of FIG. 15. Gel layer 705 is sandwiched between support sheet 205 and base sheet 920. Vinyl strips 1505C and 1505A are also visible in the cross section of FIG. 16A. In a subsequent process step, vinyl strips 1505A-1505D will be melted by a radio frequency (RF) welder to cause support sheet 205 to bond with base sheet 920. In another approach depicted in FIG. 16B, the vinyl strips 1505A-1505D are omitted so that peripheral edges of support sheet 205 directly contact the peripheral edges of base sheet 920 prior to placement in the RF welder. In this manner, support sheet 205 and base sheet 920 are directly RF welded together around their respective peripheral edges. In yet another embodiment, the vinyl strips 1505 are replaced with an adhesive, such as hot melt or Epoxy, that causes support sheet 205 to adhere to base sheet 920 around the periphery of uncut mat 1500. (Epoxy is a trademark of The Dow Chemical Company.)

Figure 17A:
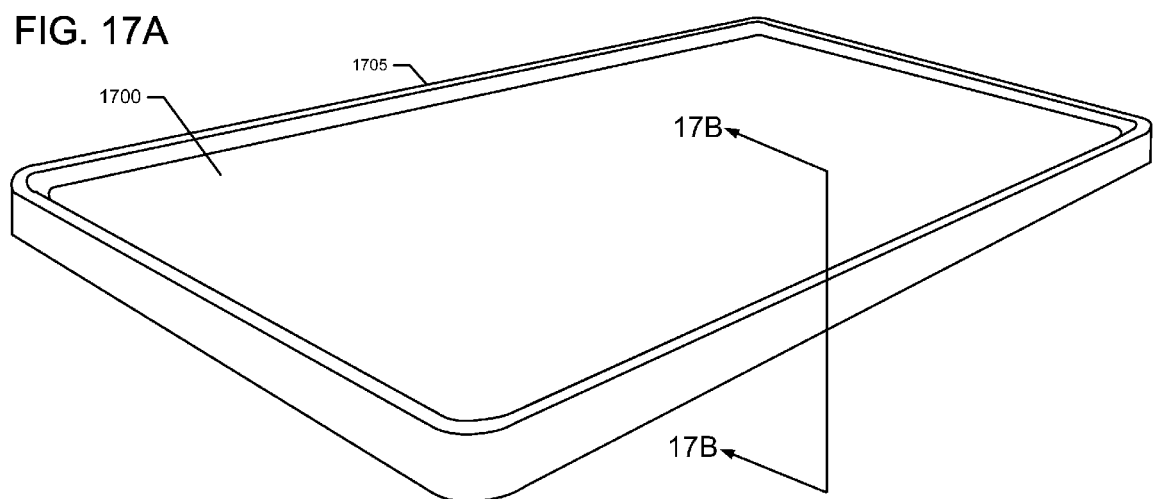
FIG. 17A is a perspective view of a lower jig used to retain the uncut mat.
Figure 17B:
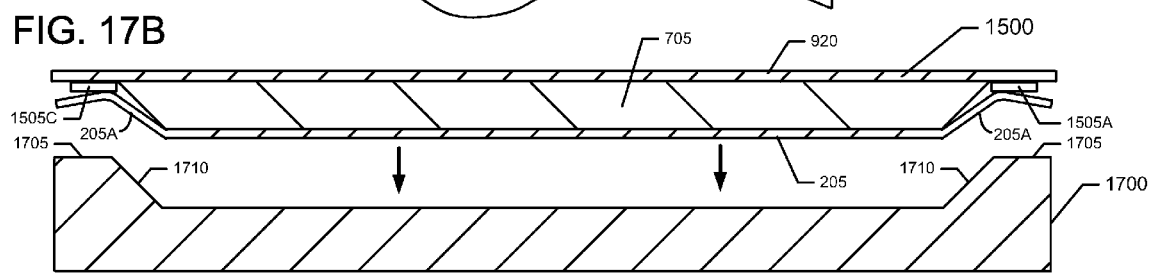
FIG. 17B is a cross section of the lower jig of FIG. 17A taken along section line 17B-17B that includes a corresponding cross section of the uncut mat that is about to be placed therein.

Returning now to FIG. 16A, vinyl strips 1500A-1500D are positioned as shown and described above. Uncut mat 1500 is next placed in a lower jig 1700 that is illustrated in FIG. 17A. More particularly, after strip placement, uncut mat 1500 is positioned in lower jig 1700 as indicated in FIG. 17B. FIG. 17B is a cross section of lower jig 1700 and uncut mat 1500 as uncut mat 1500 is oriented for placement in lower jig 1700. The cross section of lower jig 1700 depicted in FIG. 17B is taken along section line 17B-17B of FIG. 17A. Lower jig 1700 exhibits geometry similar to the geometry of uncut mat 1500. For example, if mat 1500 is rectangular, square, circular or elliptical, then lower jig 1700 is correspondingly rectangular, square, circular or elliptical. Lower jig 1700 includes a raised portion 1705 that acts as a funnel for RF energy when lower jig 1700 and uncut mat 1500 are later placed in the RF welder. FIG. 17B shows uncut mat 1500 in the inverted position and positioned above lower jig 1700 immediately before uncut mat 1500 is placed in lower jig 1700. It is noted that raised portions 1705 of lower jig 1700 include angled surfaces 1710 extending adjacent the inner perimeter of raised portions 1705. Raised portions 1710 receive and mate with the angled surface of support sheet 205 as shown. Support sheet 205 follows the angled contours of gel layer 705 and angled surfaces 1710.

Figure 18A:
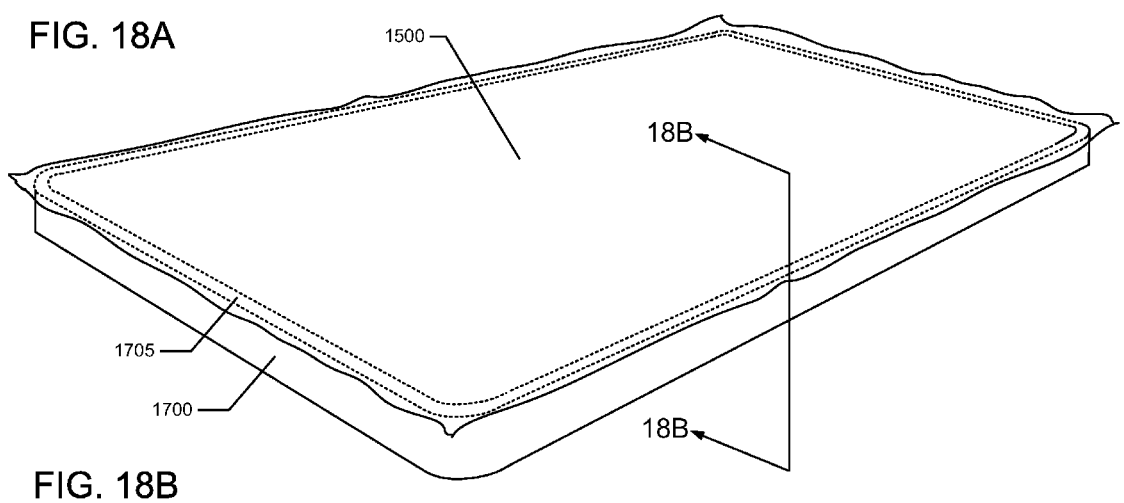
FIG. 18A is a perspective view of the lower jig with the uncut mat therein shown with a flexible sheet thereon.
Figure 18B:
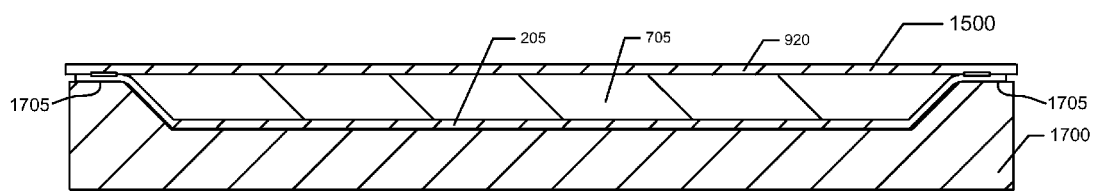
FIG. 18B is a cross section of the uncut mat and lower jig taken along section line 18B-18B of FIG. 18A.

FIG. 18A shows uncut mat 1500 fully placed in lower jig 1700 prior to being moved into the RF welder. The raised portion 1705 of lower jig 1700 is shown in dotted lines below uncut mat 1500. FIG. 18B is a cross section of lower jig 1700 and uncut mat 1500 of FIG. 18A taken along section line 18B-18B.

Figure 19A:
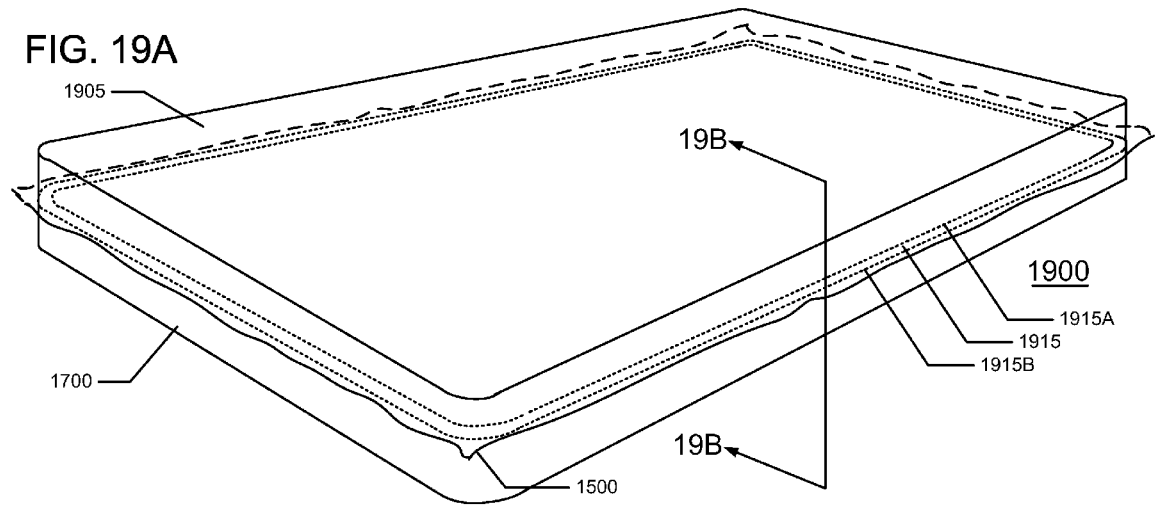
FIG. 19A is a perspective view of the complete jig with the uncut mat therein.
Figure 19B:
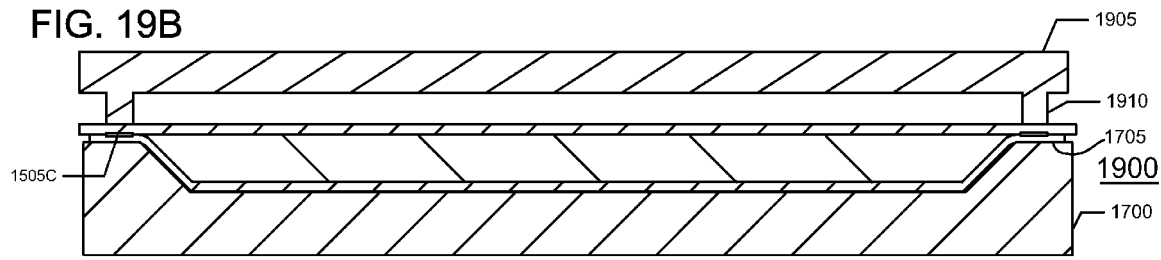
FIG. 19B is a cross section of the complete jig and uncut mat taken along section line 19B-19B of FIG. 19A.

FIG. 19A shows an upper jig 1905 situated above lower jig 1700 and uncut mat 1500 to form a completed jig assembly 1900. FIG. 19B is a cross section of jig assembly 1900 of FIG. 19A taken along section line 19B-19B. Upper jig 1905 includes a raised portion 1910 that vertically aligns with raised portion 1705 of lower jig 1700. With raised portions of upper jig 1905 and lower jig 1700 so aligned, assembly 1900 is placed in an RF welding chamber or station (not shown). When the RF welding station is activated, RF energy is directed between the raised portions 1910 of upper jig 1905 and the raised portions 1705 of lower jig 1700, thus melting vinyl strips such as strip 1505C seen in FIG. 19B. This causes the edges of uncut mat 1500 to be welded together at welded region 1915 as seen in dotted line in FIG. 19A. The inner boundary 1915A and outer boundary 1915B of welded region 1915 are indicated by the dotted lines. After completion of RF welding, upper jig 1905 is raised and the welded uncut mat is removed from lower jig 1700. Alternatively, the edges of the uncut mat could be welded together without a jig or due by using ultrasonic welding. Ultrasonic welding may be particularly applicable the larger the size of the mat becomes or for mats with irregular shapes.

Figure 20:
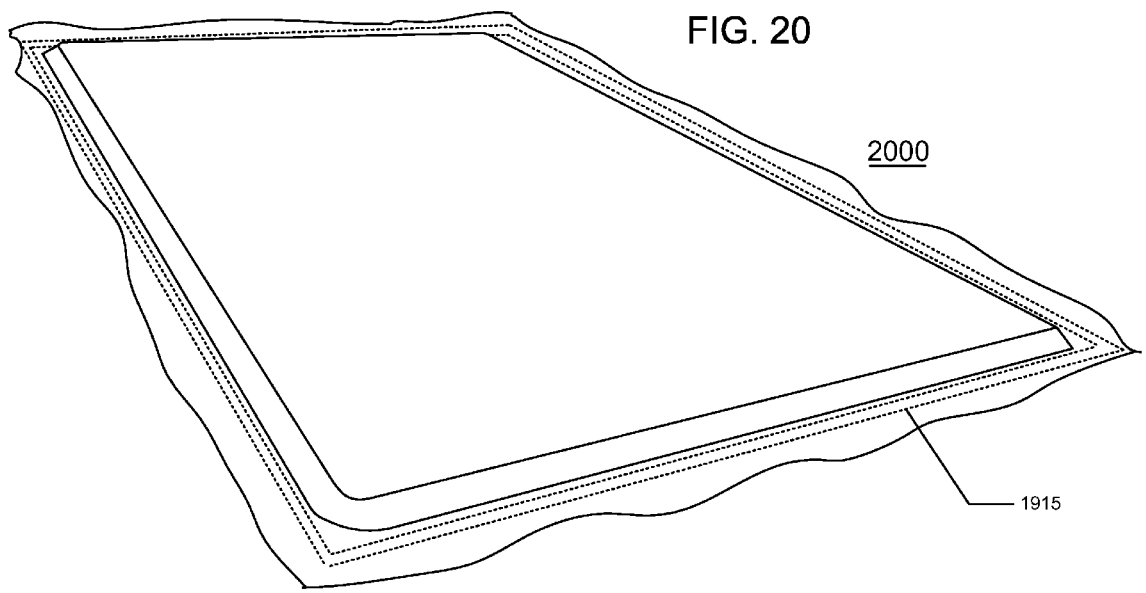
FIG. 20 is a perspective view of the uncut mat after RF welding and removal from the complete jig.
Figure 21:
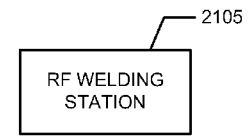
FIG. 21 is a representation of the RF welding station used to create the RF weld of FIG. 20.

FIG. 20 is a perspective view of the uncut mat after RF welding. Once RF welding is complete and removed from the jig, the uncut mat is designated as uncut mat 2000. FIG. 20 shows the welded region 1915 in dotted lines extending around the peripheral edge of uncut mat 2000. It is noted that in FIG. 20, the mat is no longer in the inverted orientation, but rather is in the normal orientation ready for use. FIG. 21 is a representation of the RF welder unit or station 2105 in which uncut mat 1500 was welded to become uncut mat 2000.

Figure 22:
FIG. 22 is a representation of a cutting station used in the assembly line to fabricate the mat.
Figure 23:
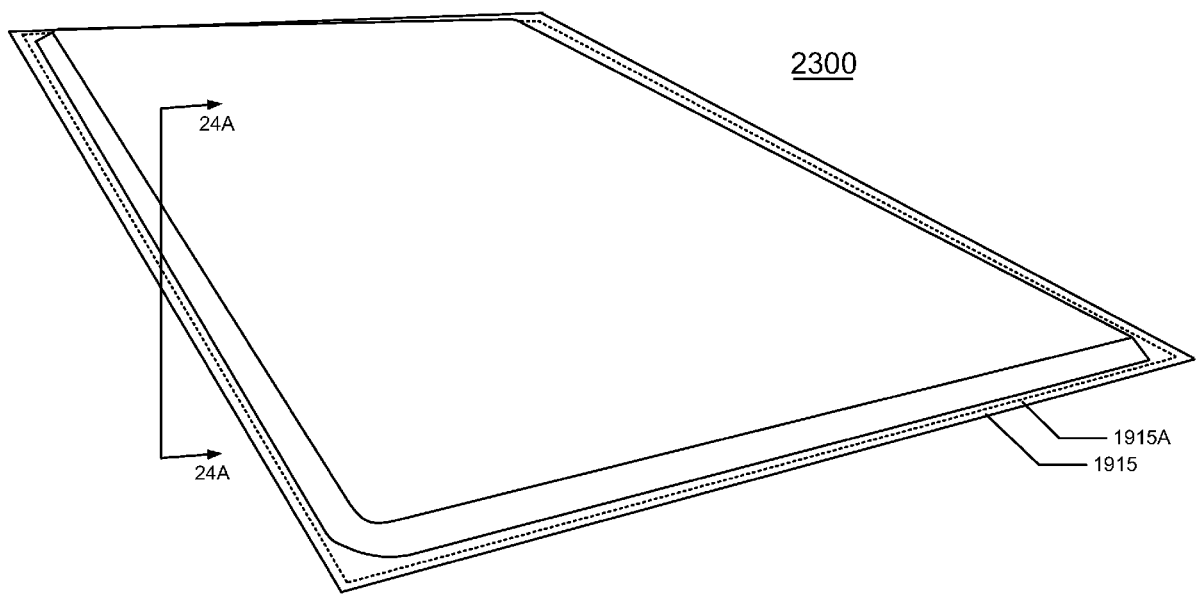
FIG. 23 is a perspective view of the mat after cutting the mat at its periphery to remove excess material.

When RF welding is complete, uncut mat 2000 is moved to a cutting station 2205 shown in FIG. 22. In one embodiment, a cut is made around the edge of uncut mat 2000 such that approximately ½ of the width of the welded region 1915 is removed. In other embodiments, more than or less than ½ the width of the welded region may be removed depending upon the particular application. FIG. 23 shows the resultant cut mat 2300. The inner boundary 1915A of welded region 1915 remains and is shown in dotted line.

Figure 24A:
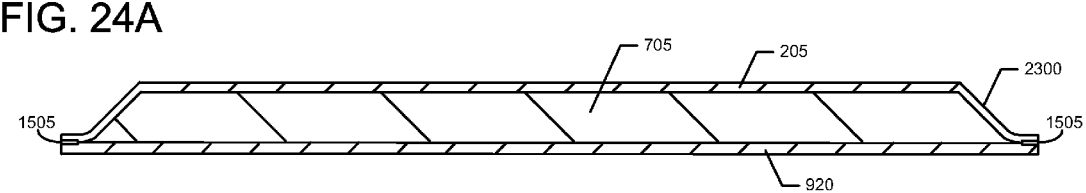
FIG. 24A is a cross section of the trimmed or cut mat of FIG. 23 taken along section line 24A-24A showing a vinyl layer used to promote connection between the sheets of the mat.
Figure 24B:
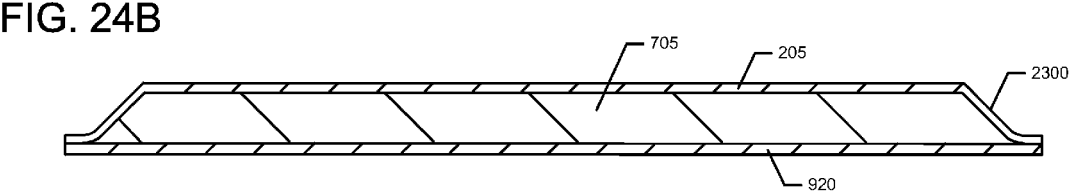
FIG. 24B is a cross section of the trimmed or cut mat of FIG. 23 taken along section line 24A-24A wherein the sheets of the mat are directly connected together without an intervening vinyl strip.

FIG. 24A shows a cross section of cut mat 2300 taken along section line 24A-24A of FIG. 23. More particularly, FIG. 24A shows the embodiment wherein vinyl strip 1505 is situated adjacent gel layer 705 and between base sheet 920 and support sheet 205. In the RF welding process, vinyl strip 1505 melts around the mat's periphery thus causing the edge of the base sheet 920 and support sheet 205 to adhere to one another. FIG. 24B shows the same cross section of cut mat 2300 except in the embodiment wherein placement of vinyl strip 1505 is omitted such that base sheet 920 and support sheet 205 bond directly to one another when placed in the RF welder. In yet another embodiment, an adhesive such as hot melt or Epoxy may be substituted for the vinyl strip 1550 around the periphery of the mat and the RF welding operation may be omitted. In this embodiment, the adhesive seals base sheet 920 to support sheet 205 around the periphery of the mat.

FIG. 25 is a flowchart that shows one embodiment of the disclosed methodology for fabricating a resilient mat. In this particular embodiment, the mat is fabricated with an inverted orientation with the support sheet 205 (on which the user stands or otherwise contacts) on the bottom and the base sheet 920 (which faces the floor or other surface) on top in the frame assembly. However, in another embodiment, this order is reversed such that the mat is fabricated in a normal orientation with base sheet 920 on the bottom and the support sheet 205 on the top in the frame assembly.

Process flow commences with start block 2500. The gel is prepared by heating gel to a temperature of approximately 380 degrees F. in one embodiment, as per block 2505. More information regarding preparation of gel 705 is included below in the flowchart of FIG. 26. The aperture frame member 210 is then opened either manually or by a process controller, as per block 2510. An operator or process controller then registers support sheet 205 on central frame member 110, as per block 2515. Once support sheet 205 is registered, aperture frame member 210 is closed. Screws are then used to secure aperture frame member 210 to central frame member 110, as per block 2520. Liquid gel 705 is then dispensed into the gel receiving cavity 310 in the frame/mat structure formed by support sheet 205, central frame member 110, aperture frame member 210 and base frame member 105, as per block 2525.

The base sheet 920 is now prepared for positioning on gel layer 705. Base sheet 920 is registered on registration panel 910, as per block 2530. The head 940 of vacuum press 935 then swings downward and contacts base sheet 920. Vacuum is then applied to head 940 such that head 940 captures base sheet 920 thereon in registered fashion, as per block 2535. Head 940 with base sheet 920 thereon now swings upward to clear the workspace at vacuum press 935, as per block 2540. The assembly formed by base frame member 105, central frame member 110, spacers 115, aperture frame member 210 and gel layer 705 is then moved into position below head 940 of the vacuum press. The head 940 of the vacuum press then swings downward such that base sheet 920 contacts gel layer 705 and aperture frame member 210, as per block 2555. The vacuum is released in head 940 and head 940 swings upward leaving base sheet member 920 atop gel layer 705 and vertically aligned with support sheet 205 below, as per block 2560. In other words, base sheet 920 is registered with respect to support sheet 205 when base sheet 920 is deposited on gel layer 705 by vacuum press 935.

The frame/mat structure formed by base sheet 920, support sheet 205, gel layer 705 and the frame members is then moved into pre-cooler 1305 to reduce the temperature of the frame/mat structure, as per block 2565. The frame/mat structure is then moved along the assembly line to main cooler 1405 to further reduce the temperature of the frame/mat structure, as per block 2570. At the main cooler, a cold plate contacts the frame/mat structure. First, the cold plate applies pressure to one end of the frame/mat structure. The cold plate then applies pressure across the frame/mat structure until reaching the opposite end of the frame/mat structure, as per block 2575. After cooling, the frame/mat structure is removed from main cooler 1405, as per block 2580. Next, screws 305 are removed to allow the opening of aperture frame member 210, as per block 2585. The uncut mat is then removed from the frame, as per block 2590. Vinyl strips 1505 are then applied around the periphery of the uncut mat between support sheet 205 and base sheet 920, as per block 2591. Vinyl strips 1505 are positioned adjacent the outermost portion of gel layer 705 near the periphery of the uncut mat.

The uncut mat with vinyl strips 1505 is then placed in lower jig 1700, as per block 2592. Next, upper jig 1905 is positioned above the uncut mat and lower jig 1700 in preparation for RF welding, as per block 2593. The jig containing the uncut mat is then moved to RF welder 2105, as per block 2594. RF welder 2150 then conducts an RF welding operation that melts the adhesive strips 1505 thus causing support sheet 205 and base sheet 920 to adhere to one another, as per block 2595. The welded but still uncut mat is then removed from RF welder 2150, as per block 2596. Next, the mat is cut in the welded region to trim away superfluous edge material, as per block 2597. The mat is now complete and the fabrication process ends at end block 2598.

Gel layer 705 provides a very pleasing feel when the user steps on the fully assembled mat. This is especially true when the user steps on the mat without wearing shoes. In one embodiment, the durometer or softness of gel layer 705 should be sufficiently high that it is comfortable for the user to step on the mat and yet sufficiently firm that the user is stable when standing on the mat. Stability here refers to the avoidance of undue lateral motion when standing on the mat. Thus, in one embodiment, the durometer of gel layer 705 is selected to be 50 on the Shore A scale with a tolerance of approximately minus 5 and approximately plus 2. Durometers greater or less than this range can also be used depending on the particular user application. In one embodiment, gel layer 705 may be formed of any synthetic rubber material that includes thermoplastic rubber and mineral oil provided that the durometer of gel layer 205 is as described above. Gel may be stored in semi-solid form prior to placement in heater 610 of FIG. 6. In one embodiment, heater 610 provides heated liquid gel to assembly 300. Gel is provided to assembly 310 in liquid form so that the gel can take the form of gel receiving cavity 310 while the mat is being fabricated.

Figure 26A:
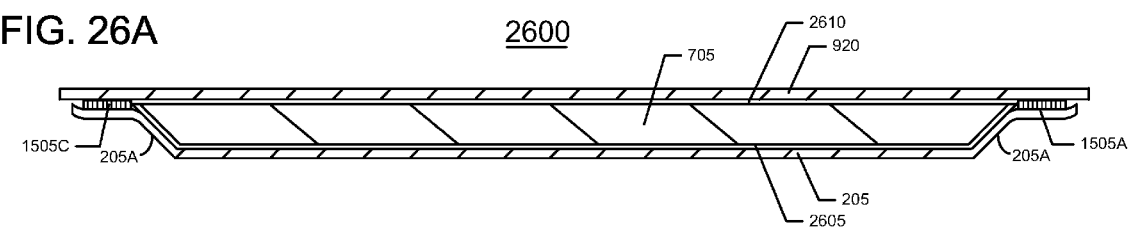
FIG. 26A is a cross section of the completed mat showing a layer near the peripheral edge of the sheets of the mat to promote coupling of the sheets together adjacent the peripheral edge.
Figure 26B:
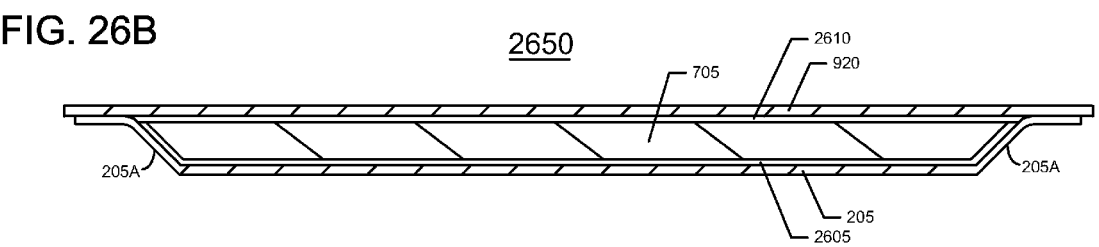
FIG. 26B is a cross section of the completed mat showing the peripheral edges of the sheet of the mat directly connected to one another.

In one embodiment shown in FIG. 26A, a buffer layer 2605 of polyurethane is sprayed or otherwise applied to the inner side of support sheet 205 that faces gel layer 705. Another buffer layer 2610 is similarly applied to the inner side of base sheet 920 that faces gel layer 705. In actual practice, buffer layers 2605 and 2610 are applied to support sheet 205 and base sheet 920 prior to placing these sheets in the frame assembly. Buffer layers 2605 and 2610 perform one or both of the following two functions. Buffer layers 2605 and 2610 prevent mineral oil in gel layer 705 from undesirably migrating from gel layer 705 through the base sheet or support sheet to the exterior of the mat. Buffer layers 2605 and 2610 may also allow gel layer 705 to move within the mat so that, when the mat is rolled up and then later unrolled, a smoother mat is achieved. FIG. 26B shows the same buffer layers 2605 and 2610 in the embodiment of the mat wherein the outer edge of support sheet 205 and base sheet 920 are directly RF welded to one another without the use of intermediate vinyl strips 1505.

Figure 26C:
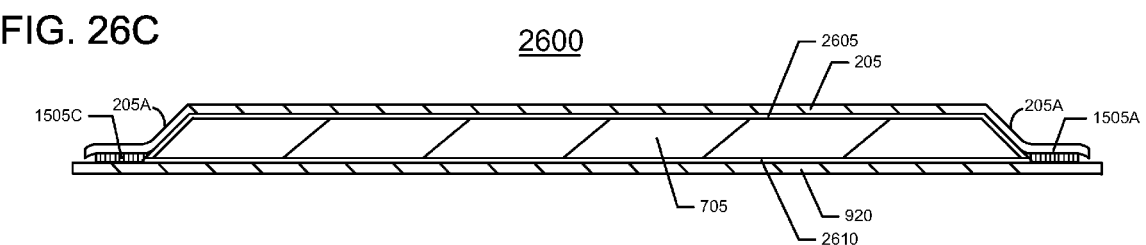
FIG. 26C is a cross section of the completed mat in the normal use position.

While FIG. 26A shows a cross section of the completed mat 2600 in the inverted orientation in which the mat was fabricated, FIG. 26C shows the same mat 2600 that has been rotated 180 degrees to the normal use orientation. In the normal user orientation, base sheet 920 is on the bottom of the mat and support sheet 205 is on the top side of the mat. Angled surface 205A of support sheet 205 provides the anti-trip feature mentioned above. The angling of surface 205A makes it less likely that a user will trip on an edge of the mat than if the edge of the mat were perpendicular.

In an alternative embodiment, rather than spraying or applying buffer layers 2605 and 2610 as described above, an intermediate sheet or buffer sheet 2705 is positioned on gel layer 705 prior to installation of base sheet 920 on the mat. For example, rather than using press 940 to position base sheet 920 on liquid gel layer 705, press 940 may position a buffer sheet 2705 on gel layer 705 to form the partially assembled mat 2700 depicted in FIG. 27A. In one embodiment, buffer sheet 2705 covers gel layer 705, but does not extend into the margin 2710 adjacent the peripheral edge of the mat. Buffer sheet 2705 is fabricated from a material that slides easily with low friction with respect to base sheet 920 that is placed on buffer sheet 2705 in a subsequent step. However, prior to placement of base sheet 920 on the mat assembly, a cold plate cooler 2715 may be placed on the mat assembly as shown in FIG. 27B to cool and remove heat from the mat assembly. Cold plate cooler 2715 may include cooling channels 2720 in which a convective gas coolant such as air or a liquid coolant such as alcohol flows. After cooling the mat assembly to the ambient or room temperature, for example approximately 75° F., the cold plate 2715 is removed from the mat assembly.

Figure 27A:
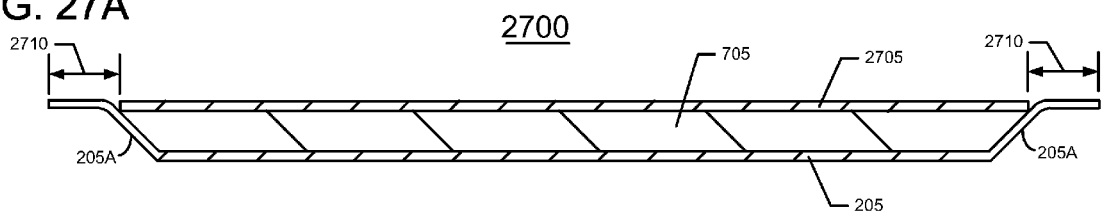
FIG. 27A is a cross section of another embodiment of the disclosed mat that employs an intermediate buffer sheet or layer.
Figure 27B:
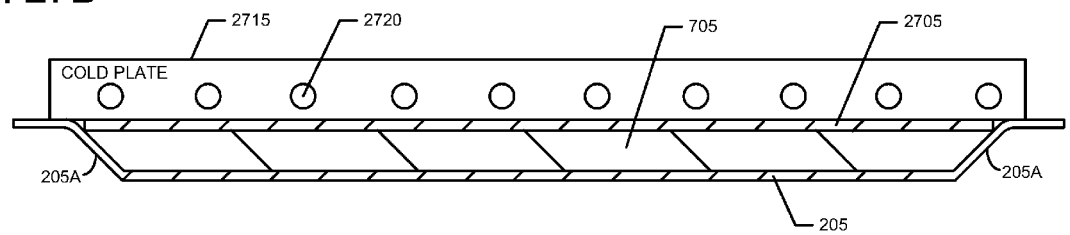
FIG. 27B is a cross section of the mat of FIG. 27A together with a cold plate for removing heat during mat fabrication.
Figure 27C:
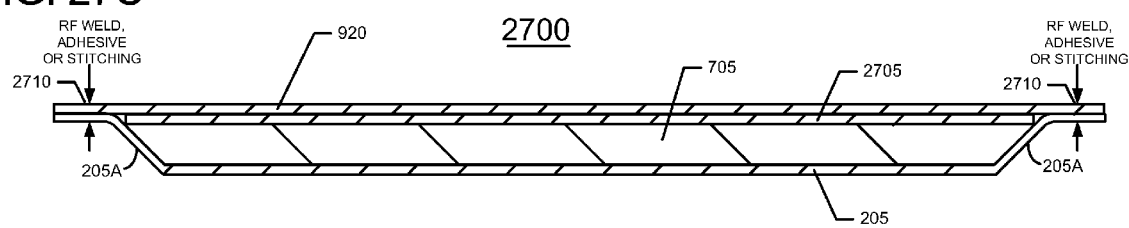
FIG. 27C is a cross section of the mat of FIG. 27A ready for RF welding.

FIG. 27C shows mat assembly 2700 after base sheet 920 is situated thereon. Base sheet 920 may be attached to support sheet 205 at margin 2710 directly by RF welding in a manner similar to that depicted in FIG. 26B or indirectly via a vinyl strip as shown in FIG. 26A. Alternatively, the peripheral edge of support sheet 205 may be adhesively coupled to the peripheral edge of base sheet 920 at margin 2710. In yet another embodiment, the peripheral edge of support sheet 205 may be sewn or stitched to the peripheral edge of base sheet 920 at margin 2710 to connect the two sheets together. As depicted in FIG. 27C, the mat assembly is still in the inverted position rather that the orientation that the user actually employs.

Figure 27D:
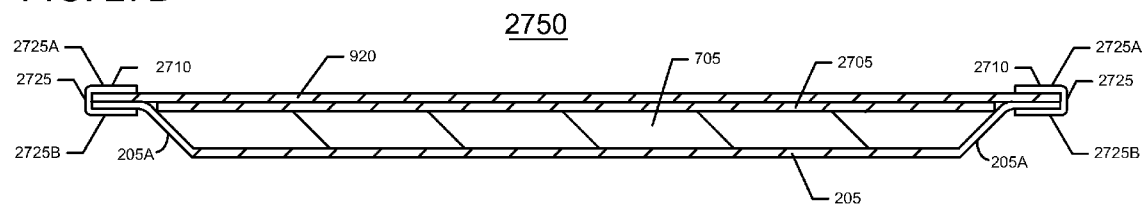
FIG. 27D is a cross section of the mat of FIG. 27A ready for stitching at its peripheral edge.

FIG. 27D shows another embodiment of the mat assembly wherein a sewn peripheral edge holds support sheet 205 and base sheet 920 together to form mat assembly 2750. In this particular sewn embodiment, a wraparound flap 2725 is positioned at the outer edge of mat assembly 2750 as shown in FIG. 27D. The mat assembly is then sewn or stitched at margin 2710 through upper flap 2725A, base sheet 920, support sheet 205 and lower flap 2725B to hold the assembly together.

As mentioned above, buffer sheet 2705 is fabricated from a material that slides with respect to base sheet 920 that is placed on buffer sheet 2705. However, buffer sheet 2705 adheres to gel layer 705. One material that is suitable for buffer sheet 2705 is a fabric such as a cotton or Nylon sheet, for example. Such a material adheres to the gel but allows the base sheet 920 to move with respect to buffer sheet 2705 and the gel layer 705 attached to buffer sheet 2705. A pocket of air (not shown) may exist between buffer sheet 2705 and base sheet 920.

By allowing base sheet 920 to move with relatively low friction with respect to gel layer 705, buffer sheet 2705 may prevent wrinkling of the mat assembly when the mat assembly is rolled up for shipment and then unrolled for actual use. Buffer sheet 2705 may also form a barrier that reduces migration of liquid contained in gel layer 705. For example, if gel layer 705 contains any oils that may separate from the gel over time, then buffer sheet 2705 acts as a barrier that stops or reduces the flow of such liquids to the base sheet 920 of the mat.

Positioning buffer sheet 2705 on gel layer 705 as shown in FIG. 27A and FIG. 27B, allows cold plate 2715 to quickly draw heat out of the heated gel layer 705. This speeds up the manufacturing process. Moreover, buffer sheet 2705 prevents cold plate 2715 from sticking to gel layer 705 which could otherwise damage the mat assembly. In one embodiment, cold plate 2715 is applied to the mat assembly of FIG. 27B immediately after application of buffer sheet 2705 to gel layer 705 to remove heat therefrom prior to installing base sheet 920 on the mat assembly. In one embodiment, when heat is so removed from the mat assembly, the previously liquid gel layer 705 becomes semi-solid.

Figure 27E:
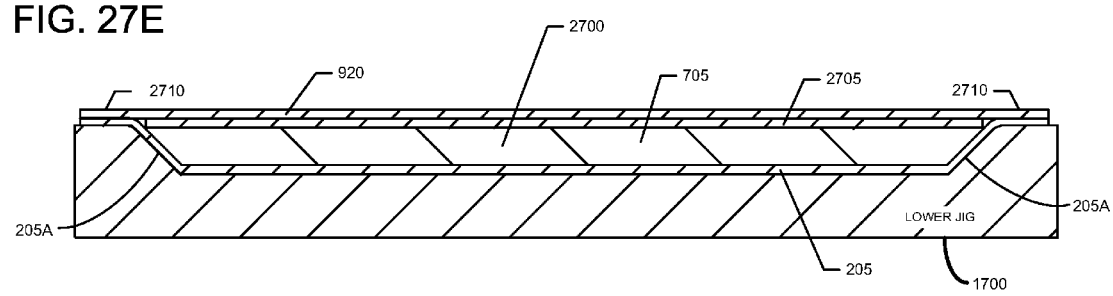
FIG. 27E is a cross section of the mat of FIG. 27C shown in a lower jig of an RF welder.
Figure 27F:
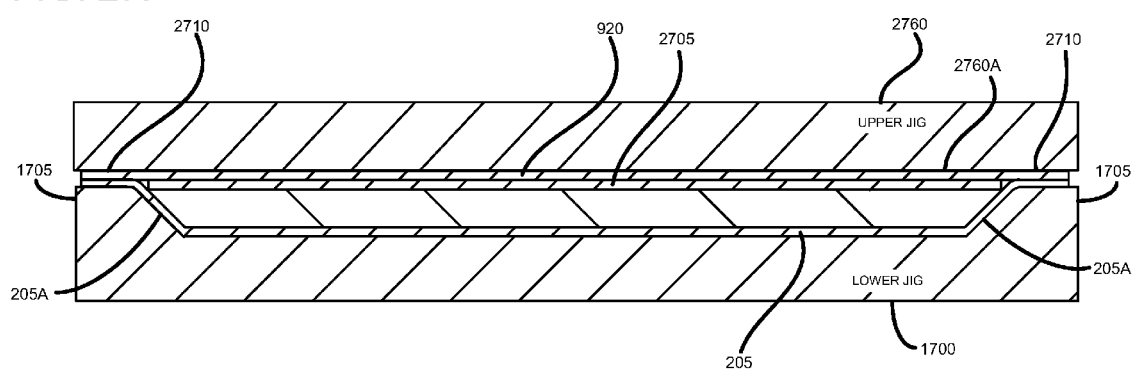
FIG. 27F is a cross section of the mat of FIG. 27E shown position in an RF welder including both a lower jig and an upper jig.

As described above with respect to FIG. 27C, RF welding may be employed to hold mat 2700 together at margin 2710. More particularly, RF welding forms a weld that bonds support sheet 205 to base sheet 920 at margin 2710. One RF welding apparatus that may be used to weld these components together is lower jig 1700 of FIGS. 17A, 17B and upper jig 1905 of FIGS. 19A, 19B. FIG. 27E-FIG. 27F, taken together, show an alternative jig for RF welding support sheet 205 to base sheet 920 in the embodiment that includes buffer sheet 2705. More particularly, FIG. 27E shows mat assembly 2700 situated in lower jig 1700, namely the same lower jig depicted in FIGS. 17A, 17B. However, FIG. 27F shows mat assembly 2700 with a different upper jig 2760 than upper jig 1905 of FIGS. 19A, 19B. Whereas upper jig 1905 includes protrusions 1910 to help direct the RF energy employed in the RF welding process, upper jig 2760 of FIG. 27F exhibits a flat surface 2760A that contacts support sheet 920. When upper jig 2760 is moved and pressed into contact with mat assembly 2700, the flat surface 2760A helps reduce wrinkling in the mat. The raised portions 1705 of lower jig 1700 assure that the RF welding energy flows through support sheet 205 and base sheet 920 at margin 2710 to form the RF weld at that location as desired.

A methodology for fabricating a resilient mat is thus disclosed in the above description. The fabricated mat is typically comfortable on which to stand or otherwise use to support a part of the body. It should be understood that the steps in the described method need not necessarily be performed in the order described.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of fabricating an anti-fatigue mat comprising:
providing first and second frame members, the second frame member including an aperture for receiving liquid gel therein;
positioning the second frame member in an open position that is spaced apart with respect to the first frame member so that the first frame member and second frame member may receive a first flexible sheet therebetween;
positioning the first flexible sheet on the first frame member while the first and second frame members are in the open position;
moving the second frame member to a closed position such that the first flexible sheet is captured between the second frame member and the first frame member, the aperture of the second frame member exposing a portion of the first flexible sheet;
dispensing the liquid gel into the aperture in the second frame member so that the liquid gel covers the portion of the first flexible sheet exposed by the aperture; and
positioning a second flexible sheet covering the gel.

2. The method of claim 1, wherein the liquid gel is formed by heating semi-solid gel to become liquid gel prior to the dispensing step.

3. The method of claim 1, wherein the moving the second frame member step comprises rotating the second frame member with respect to the first frame member.

4. The method of claim 1, wherein the positioning the second flexible sheet step comprises:
capturing, by a head of a vacuum press, the second flexible sheet;
moving the head of the vacuum press to bring the second flexible sheet in contact with the liquid gel;
depositing, by the vacuum press, the second flexible sheet on the liquid gel.

5. The method of claim 4, wherein the second flexible sheet is substantially aligned with respect to the first flexible sheet.

6. The method of claim 1, wherein the second flexible sheet includes first and second opposed ends and a lengthwise dimension therebetween, the step of positioning the second flexible sheet further comprising:
positioning the first end of the second flexible sheet on the liquid gel and then proceeding along the lengthwise dimension of the second flexible sheet to position the second flexible sheet on the liquid gel until the second end of the second flexible sheet is fully positioned on the liquid gel.

7. The method of claim 1, further comprising cooling the first frame member, the second frame member, the first flexible sheet, the second flexible sheet and the liquid gel to solidify the liquid gel.

8. The method of claim 7, wherein the cooling step comprises convectively cooling the liquid gel by supplying air to at least one air channel formed between the first frame member and a third frame member that is spaced apart from the first frame member.

9. The method of claim 7, wherein the cooling step comprises liquid cooling the liquid gel by supplying a liquid coolant to at least one coolant channel formed between the first frame member and a third frame member spaced apart from the first frame member.

10. The method of claim 7, wherein the cooling step comprises applying a cold plate to the second flexible sheet to cool the second flexible sheet, the liquid gel and the first flexible sheet.

11. The method of claim 10, wherein the applying a cold plate step is performed by pressing the cold plate toward the second flexible sheet.

12. The method of claim 1, further comprising attaching the first flexible sheet to the second flexible sheet adjacent an outer edge of the first flexible sheet and an outer edge of the second flexible sheet.

13. The method of claim 12, wherein the attaching step comprises one of RF welding the first flexible sheet to the second flexible sheet adjacent an outer edge thereof, adhesively attaching the first flexible sheet to the second flexible sheet adjacent an outer edge thereof, and sewing the first flexible sheet to the second flexible sheet adjacent an outer edge thereof.

14. The method of claim 12, further comprising cutting the first and second flexible sheets adjacent the outer edges of the first and second flexible sheets.

15. The method of claim 1, wherein the first and second frame members, the first and second flexible sheets, and the aperture in the second frame member exhibit one of rectangular, square, circular or elliptical geometries.

16. A method of fabricating an anti-fatigue mat comprising:
providing first and second frame members, the second frame member including an aperture for receiving liquid gel therein;
positioning the second frame member in an open position that is spaced apart with respect to the first frame member so that the first frame member and second frame member may receive a first flexible sheet therebetween;
positioning the first flexible sheet on the first frame member while the first and second frame members are in the open position;
moving the second frame member to a closed position such that the first flexible sheet is captured between the second frame member and the first frame member, the aperture of the second frame member exposing a portion of the first flexible sheet;
dispensing the liquid gel into the aperture in the second frame member to form a gel layer that the gel covers the portion of the first flexible sheet exposed by the aperture;
positioning a flexible buffer sheet covering the gel layer in the aperture and
positioning a second flexible sheet covering the flexible buffer sheet.

17. The method of claim 16, wherein the liquid gel is formed by heating semi-solid gel to become liquid gel prior to the dispensing step.

18. The method of claim 16, wherein the moving the second frame member step comprises rotating the second frame member with respect to the first frame member.

19. The method of claim 16, wherein the second flexible sheet is substantially aligned with respect to the first flexible sheet.

20. The method of claim 16, wherein the flexible buffer sheet adheres to the gel layer and performs at least one of preventing liquid migration from the gel layer to the second flexible sheet and allowing the gel layer to move within the mat such that the gel layer and flexible buffer sheet may move with respect to the second flexible sheet.

21. The method of claim 16, further comprising attaching the first flexible sheet to the second flexible sheet adjacent an outer edge of the first flexible sheet and an outer edge of the second flexible sheet.

22. The method of claim 16, wherein the attaching step comprises one of RF welding the first flexible sheet to the second flexible sheet adjacent an outer edge thereof, adhesively attaching the first flexible sheet to the second flexible sheet adjacent an outer edge thereof, and sewing the first flexible sheet to the second flexible sheet adjacent an outer edge thereof.

* * * * *